United States Patent
Nakahara

(10) Patent No.: US 9,500,842 B2
(45) Date of Patent: Nov. 22, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Makoto Nakahara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/867,512

(22) Filed: Sep. 28, 2015

(65) Prior Publication Data
US 2016/0097920 A1  Apr. 7, 2016

(30) Foreign Application Priority Data
Oct. 3, 2014 (JP) .................................. 2014-204657

(51) Int. Cl.
*G02B 9/04* (2006.01)
*G02B 15/20* (2006.01)
*G02B 15/177* (2006.01)
*G02B 27/00* (2006.01)

(52) U.S. Cl.
CPC ............. *G02B 15/20* (2013.01); *G02B 15/177* (2013.01); *G02B 27/0025* (2013.01)

(58) Field of Classification Search
CPC .............. G02B 15/20; G02B 15/1777; G02B 27/0025; G02B 9/04
See application file for complete search history.

(56) References Cited

U.S. PATENT DOCUMENTS

2014/0268367 A1* 9/2014 Kawamura ............ G02B 13/04
                                                       359/708

FOREIGN PATENT DOCUMENTS

| JP | 2005-106878 A | 4/2005 |
| JP | 2007-094174 A | 4/2007 |
| JP | 2009-169051 A | 7/2009 |

* cited by examiner

*Primary Examiner* — Joseph P Martinez
(74) *Attorney, Agent, or Firm* — Carter, DeLuca, Farrell & Schmidt, LLP

(57) ABSTRACT

The maximum amount of movement DF1 of a first focus lens section during focusing, the maximum amount of movement DF2 of a second focus lens section during focusing, the focal length fLP of a lens section LP, the focal length fF2 of the second focus lens section, the focal length fLRw of a rear unit at the wide angle end, and the focal length fw of the entire system at the wide angle end are appropriately configured.

9 Claims, 10 Drawing Sheets

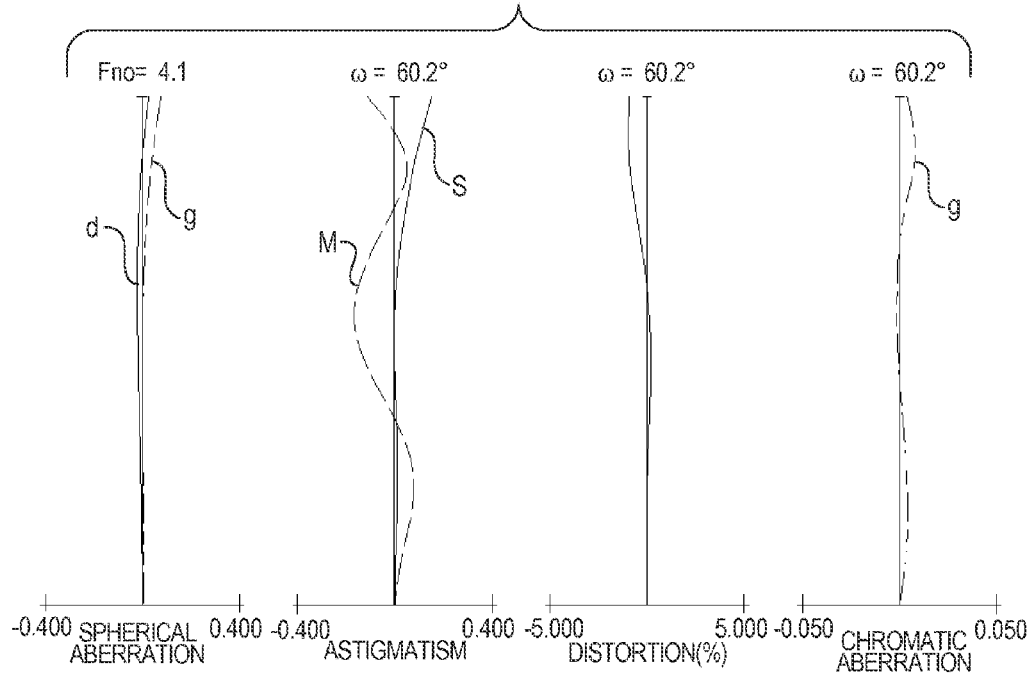
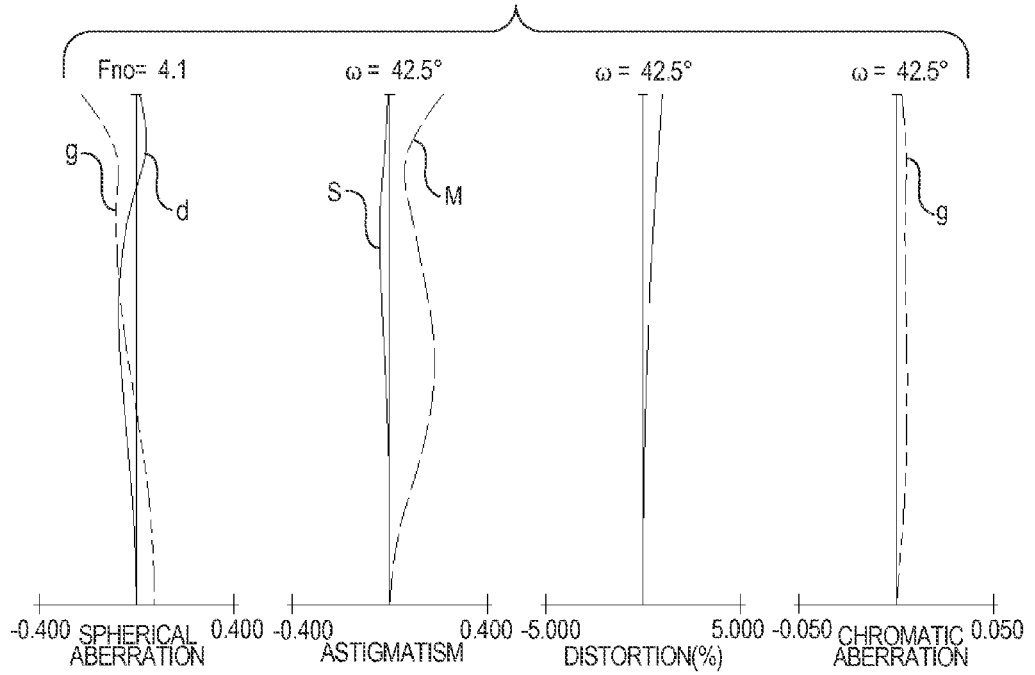

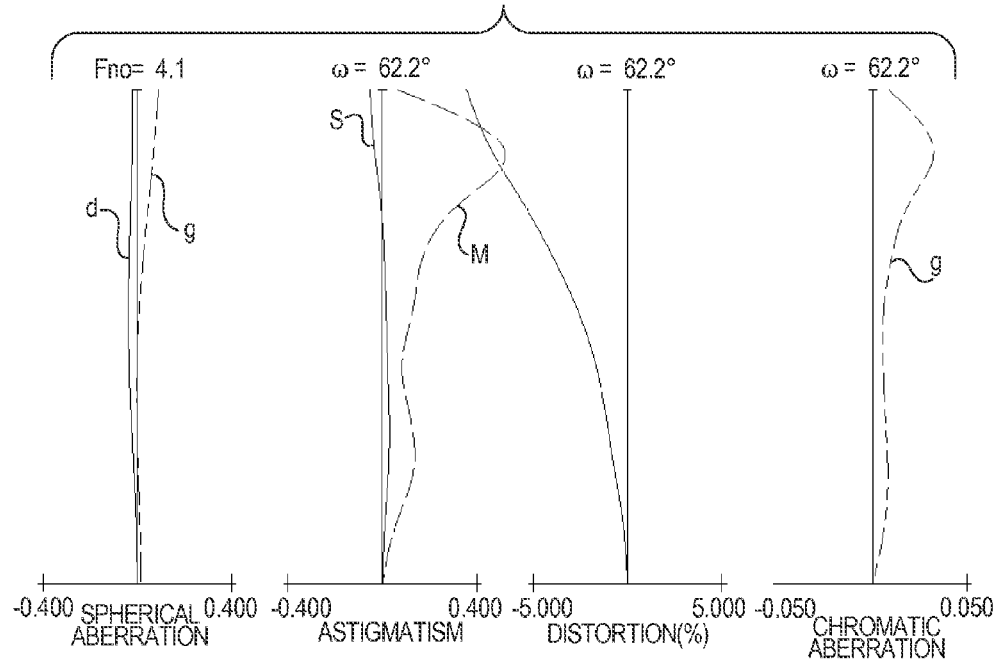
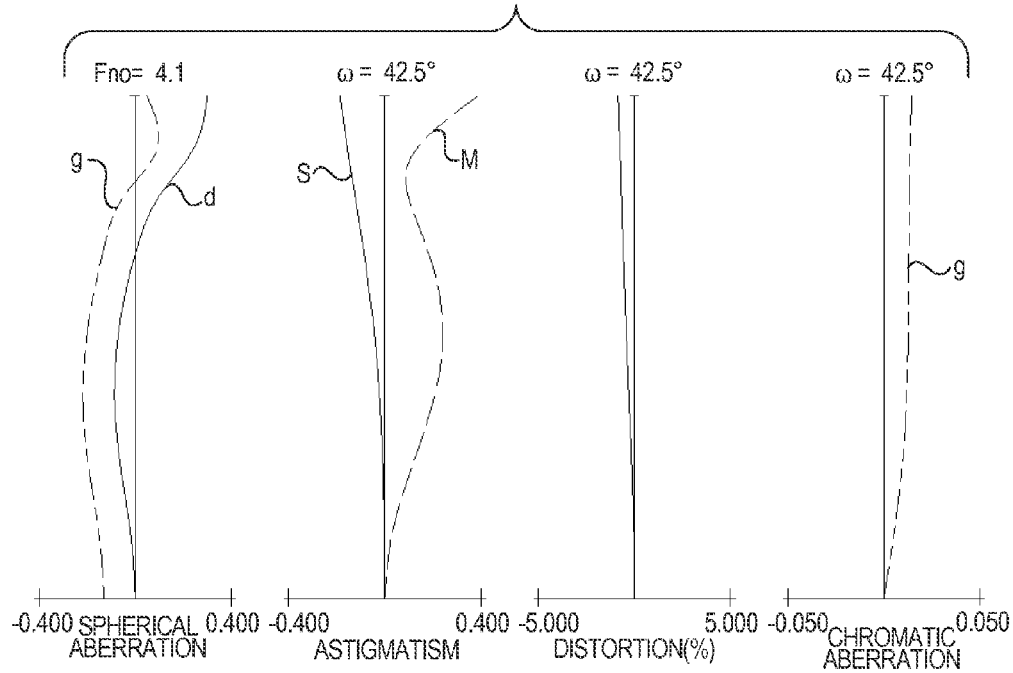

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and is suitable for an image pickup optical system included in an image pickup apparatus, such as a digital camera, a video camera, a television camera, a monitoring camera, or a camera for silver halide film.

Description of the Related Art

An image pickup optical system included in an image pickup apparatus is required to have a wide angle of view, a small size in terms of the entire system, and a high resolution. Furthermore, the focus unit is required to have a small size and lightweight, and a small variation in optical characteristics during focusing.

Conventionally, an inner-focus zoom lens where a lens unit having a negative refractive power is arranged on the most object side has been known as a zoom lens that satisfies these requirements.

Japanese Patent Application Laid-Open No. 2005-106878 discloses a zoom lens which consists of, in order from the object side to the image side: a first lens unit having a negative refractive power; a second lens unit having a positive refractive power; a third lens unit having a positive refractive power; and a fourth lens unit having a positive or negative refractive power, the zoom lens performing zooming by changing the intervals between the lens units. The zoom lens of Japanese Patent Application Laid-Open No. 2005-106878 performs focusing by moving a certain or some lens sections in the first lens unit. Japanese Patent Application Laid-Open No. 2007-94174 discloses a zoom lens which consists of, in order from the object side to the image side: a first lens unit having a negative refractive power; and a second lens unit having a positive refractive power, the zoom lens performing zooming by changing the interval between the lens units. The zoom lens of Japanese Patent Application Laid-Open No. 2007-94174 performs focusing by moving a certain or some lens sections of the second lens unit.

Japanese Patent Application Laid-Open No. 2009-169051 discloses a zoom lens which consists of, in order from the object side to the image side, a first to fourth lens units having negative, positive, negative and positive refractive powers, respectively, the zoom lens performing zooming by changing the intervals between the lens units. The zoom lens of Japanese Patent Application Laid-Open No. 2009-169051 performs focusing by moving a certain or some lens sections of the first lens unit and a certain or some lens sections of the third lens unit.

To achieve a wide angle of view while securing a predetermined zoom ratio and to achieve fine optical characteristics over the entire zoom range and the entire object distance range in a zoom lens, appropriate configuration of elements that constitute the zoom lens is important. The negative-lead zoom lens described above is asymmetric in terms of the entire lens system. Consequently, if focusing is performed by moving a certain or some lens sections of the lens system in the optical axis direction, variation in aberration tends to increase and the optical characteristics tend to be degraded.

Consequently, to achieve fine optical characteristics over the entire zoom range and the entire object distance range in the negative-lead zoom lens, appropriate setting of a zoom type (the number of lens units and the refractive power of each lens unit), selection of a lens section for focusing, and configuration of lenses is important. In particular, in the case of adopting a floating type that moves multiple lens sections during focusing to reduce variation in aberration during focusing, appropriate selection of multiple lens sections is important.

SUMMARY OF THE INVENTION

A zoom lens according to the present invention comprises, in order from an object side to an image side: a front unit that consists of a first lens unit having a negative refractive power; and a rear unit that includes at least one lens unit and has a positive refractive power over an entire zoom range, an interval between the front unit and the rear unit varying during zooming, wherein the rear unit includes: a first focus lens section that has a positive refractive power and moves to the image side during focusing from infinity to a close range; a second focus lens section that has a negative refractive power and moves to the image side along a locus different from a locus of the first focus lens section during focusing from infinity to the close range; and a lens section LP that has a positive refractive power and is immovable during focusing, the lens section LP being arranged on the image side with respect to the second focus lens section, and the zoom lens satisfies following conditional expressions, $0.0 < DF2/DF1 < 1.0$, $0.5 < fLP/fLRw < 1.2$, and $-30.0 < fF2/fw < -6.0$, where DF1 is a maximum amount of movement of the first focus lens section during focusing from infinity to the close range, DF2 is a maximum amount of movement of the second focus lens section during focusing from infinity to the close range, fLP is a focal length of the lens section LP, fF2 is a focal length of the second focus lens section, fLRw is a focal length of the rear unit at a wide angle end, and fw is a focal length of the zoom lens at the wide angle end.

Further features of the present invention will become apparent from the following description of exemplary embodiments with reference to the attached drawings.

BRIEF DESCRIPTION OF THE DRAWINGS

FIG. 2A is an aberration diagram of Embodiment 1 of the present invention at the wide angle end when focused on infinity.

FIG. 2B is an aberration diagram of Embodiment 1 of the present invention at the telephoto end when focused on infinity.

FIG. 6A is an aberration diagram of Embodiment 2 of the present invention at the wide angle end when focused on the close range.

FIG. 6B is an aberration diagram of Embodiment 2 of the present invention at the telephoto end when focused on the close range.

DESCRIPTION OF THE EMBODIMENTS

Favorable embodiments of the present invention are hereinafter described in detail with reference to the accompanying drawings. A zoom lens of the present invention includes, in order from the object side to the image side: a front unit that consists of a first lens unit having a negative refractive power; and a rear unit that includes at least one lens unit and has a positive refractive power over the entire zoom range. Here, the lens unit is lens elements that integrally move during zooming. It is sufficient that the lens unit includes at least one lens. The lens unit does not necessarily have multiple lenses. During zooming, the interval between the front unit and the rear unit varies.

The rear unit includes a first focus lens section having a positive refractive power and a second focus lens section having a negative refractive power which move to the image side independently from each other during focusing from infinity to the close range. The second focus lens section is arranged on the image side with respect to the first focus lens section. Furthermore, the rear unit includes a lens section that has a positive refractive power at any position on the image side with respect to the second focus lens section and is immovable during focusing. The negative-lead zoom lens is asymmetric in terms of the entire lens system. Consequently, when focusing is performed by moving a certain or some lens sections of the lens system in the optical axis direction, variation in aberration increases. Accordingly, it becomes difficult to favorably maintain the optical characteristics.

To address this problem, the zoom lens of the present invention performs focusing by appropriately moving the first focus lens section and the second focus lens section to thus reduce variation in aberration over the entire object distance range, thereby achieving fine optical characteristics.

Figure 1A:
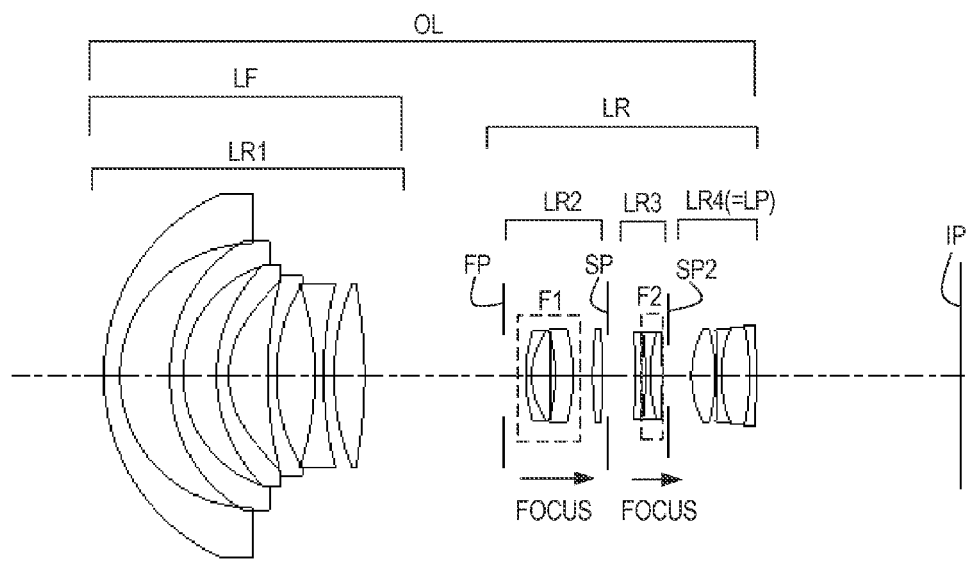
FIG. 1A is a lens sectional view of Embodiment 1 of the present invention at a wide angle end.
Figure 1B:
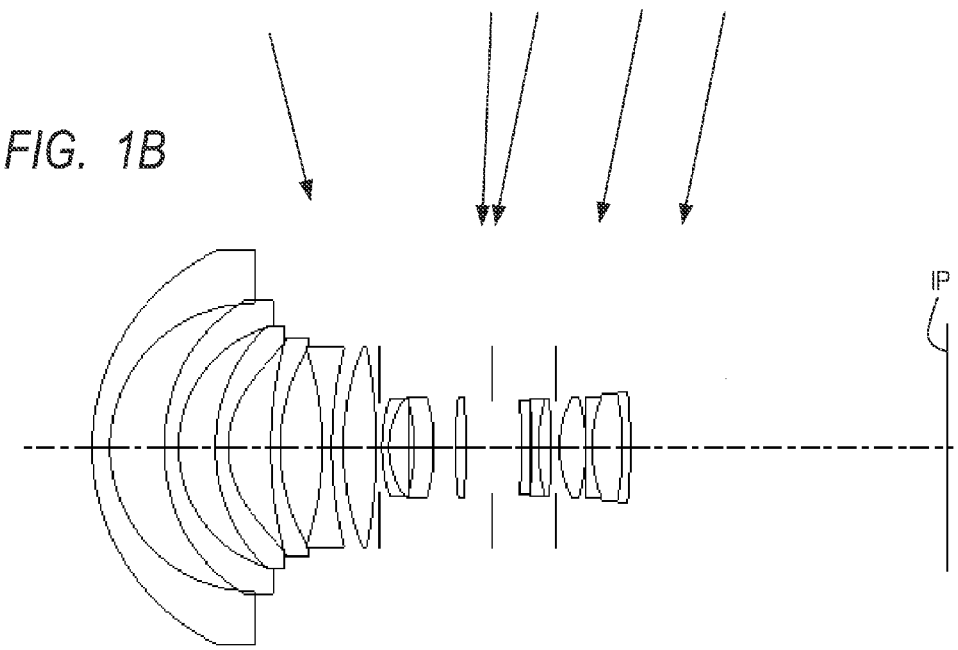
FIG. 1B is a lens sectional view of Embodiment 1 of the present invention at a telephoto end.
Figure 3A:
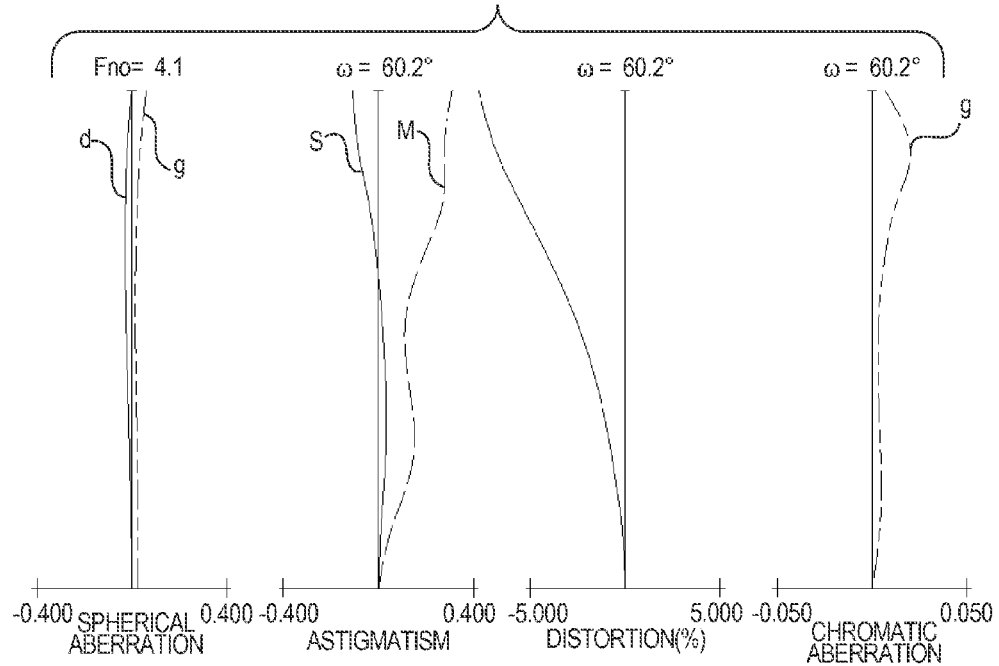
FIG. 3A is an aberration diagram of Embodiment 1 of the present invention at the wide angle end when focused on the close range.
Figure 3B:
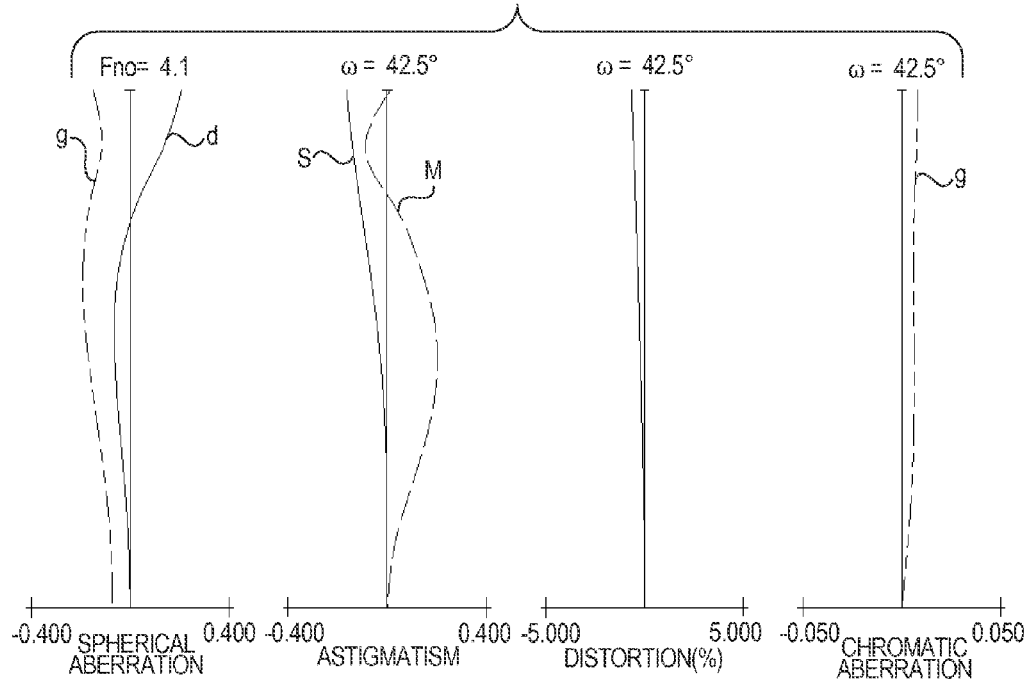
FIG. 3B is an aberration diagram of Embodiment 1 of the present invention at the telephoto end when focused on the close range.

FIGS. 1A and 1B are lens sectional views of a zoom lens of Embodiment 1 at the wide angle end (short focal length end) and the telephoto end (long focal length end), respectively, when focused on infinity. FIGS. 2A and 2B are aberration diagrams of the zoom lens of Embodiment 1 at the wide angle end and the telephoto end, respectively, when focused on infinity. FIGS. 3A and 3B are aberration diagrams of the zoom lens of Embodiment 1 at the wide angle end and the telephoto end, respectively, when focused on the close range.

Figure 4A:
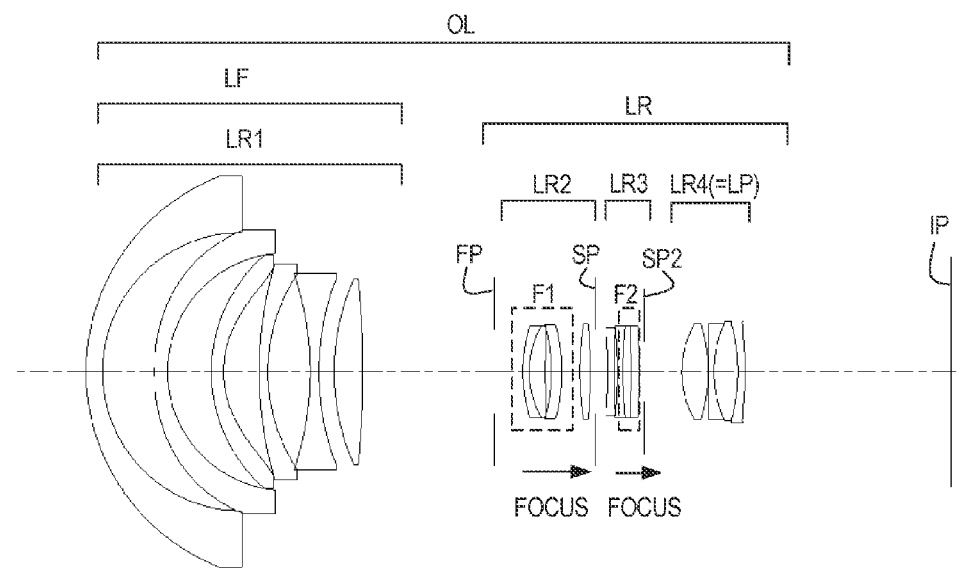
FIG. 4A is a lens sectional view of Embodiment 2 of the present invention at the wide angle end.
Figure 4B:
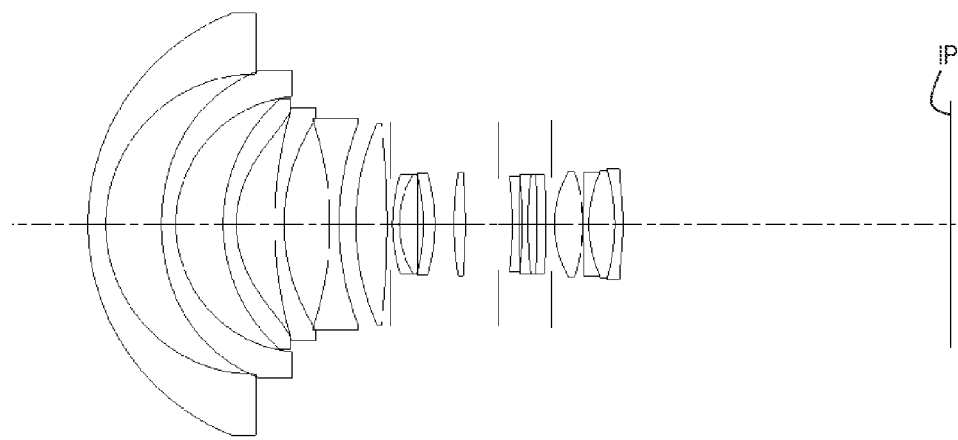
FIG. 4B is a lens sectional view of Embodiment 2 of the present invention at the telephoto end.
Figure 5A:
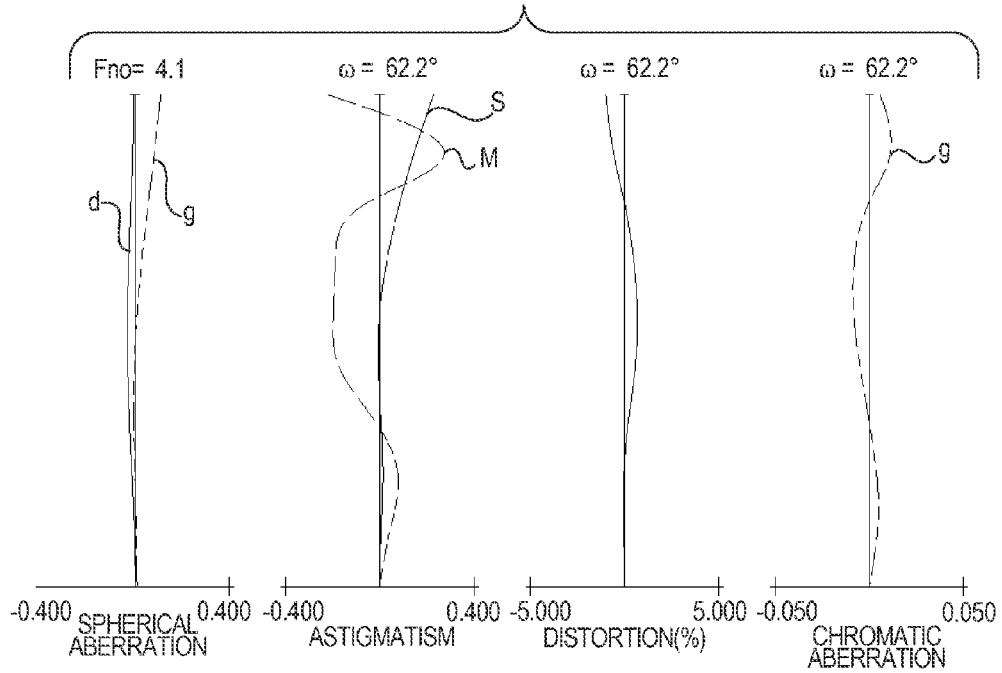
FIG. 5A is an aberration diagram of Embodiment 2 of the present invention at the wide angle end when focused on infinity.
Figure 5B:
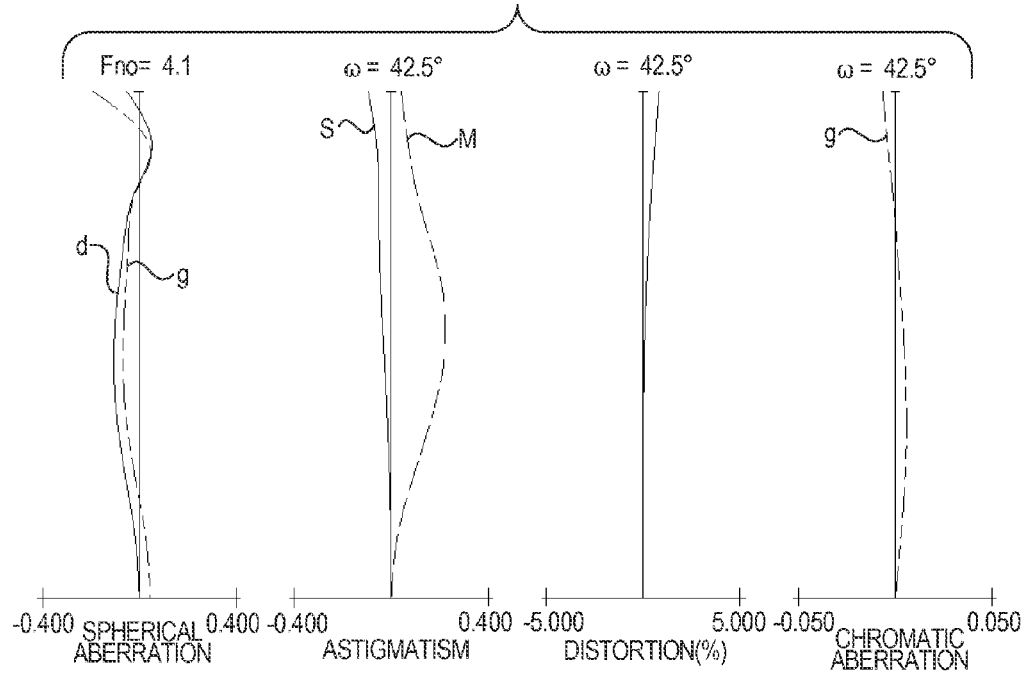
FIG. 5B is an aberration diagram of Embodiment 2 of the present invention at the telephoto end when focused on infinity.

FIGS. 4A and 4B are lens sectional views of a zoom lens of Embodiment 2 at the wide angle end and the telephoto end, respectively, when focused on infinity. FIGS. 5A and 5B are aberration diagrams of the zoom lens of Embodiment 2 at the wide angle end and the telephoto end, respectively, when focused on infinity. FIGS. 6A and 6B are aberration diagrams of the zoom lens of Embodiment 2 at the wide angle end and the telephoto end, respectively, when focused on the close range.

Figure 7A:
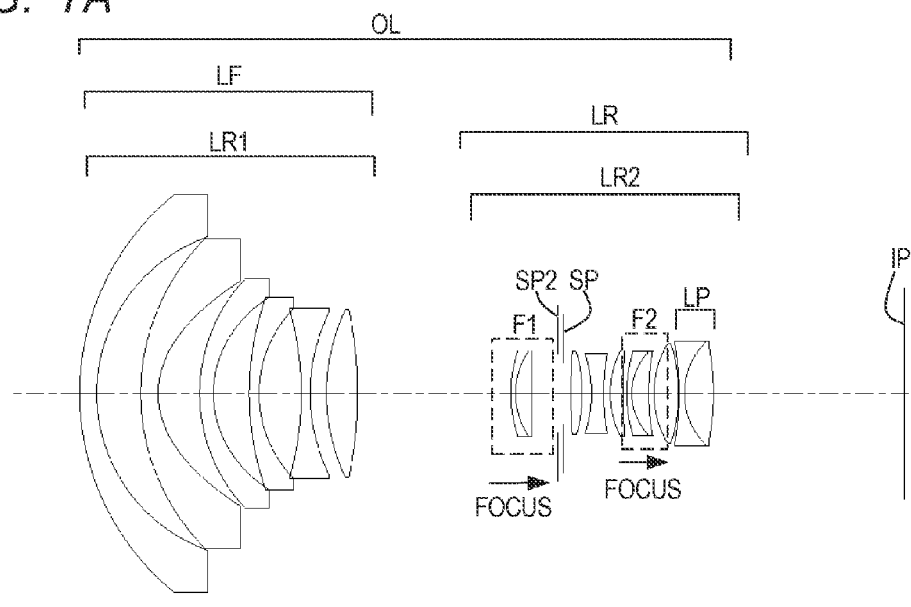
FIG. 7A is a lens sectional view of Embodiment 3 of the present invention at the wide angle end.
Figure 7B:
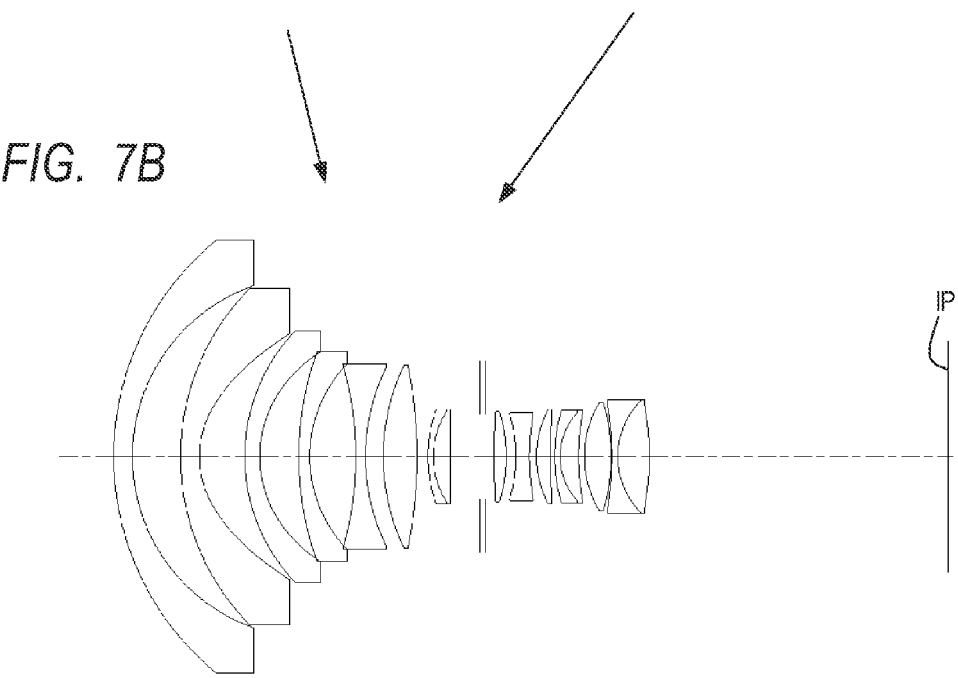
FIG. 7B is a lens sectional view of Embodiment 3 of the present invention at the telephoto end.
Figure 8A:
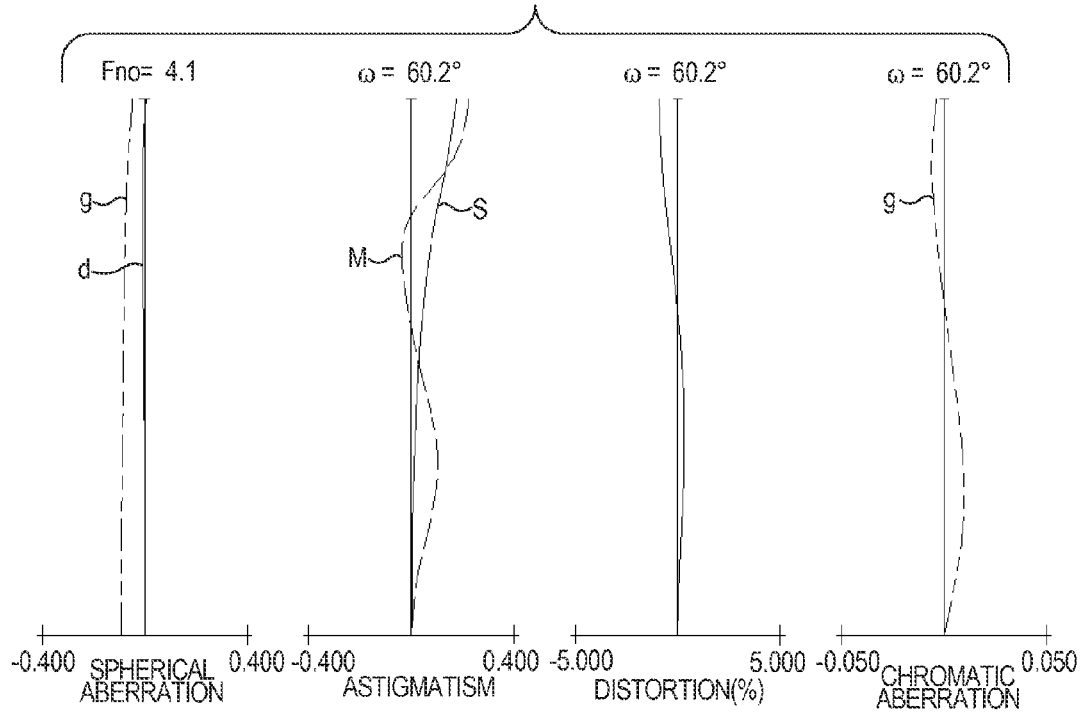
FIG. 8A is an aberration diagram of Embodiment 3 of the present invention at the wide angle end when focused on infinity.
Figure 8B:
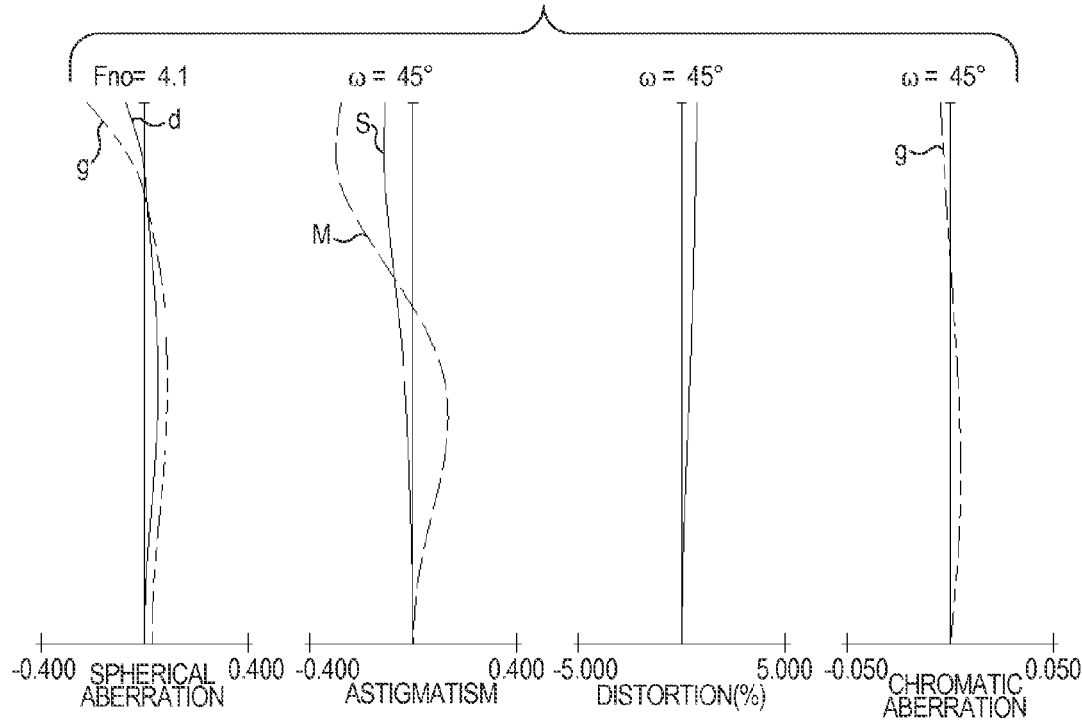
FIG. 8B is an aberration diagram of Embodiment 3 of the present invention at the telephoto end when focused on infinity.
Figure 9A:
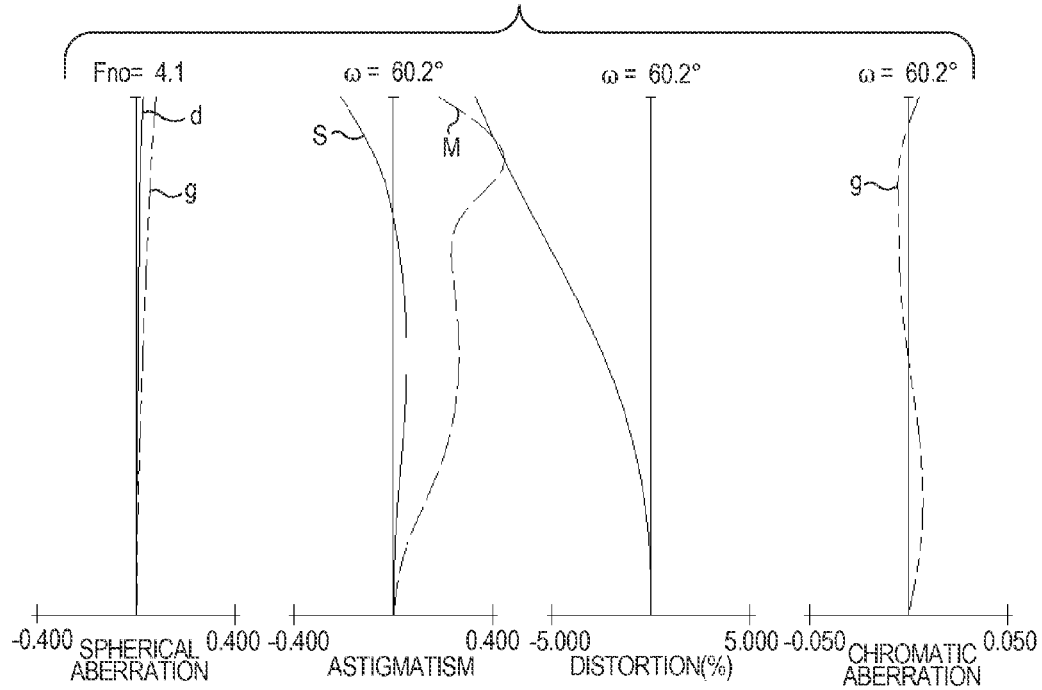
FIG. 9A is an aberration diagram of Embodiment 3 of the present invention at the wide angle end when focused on the close range.
Figure 9B:
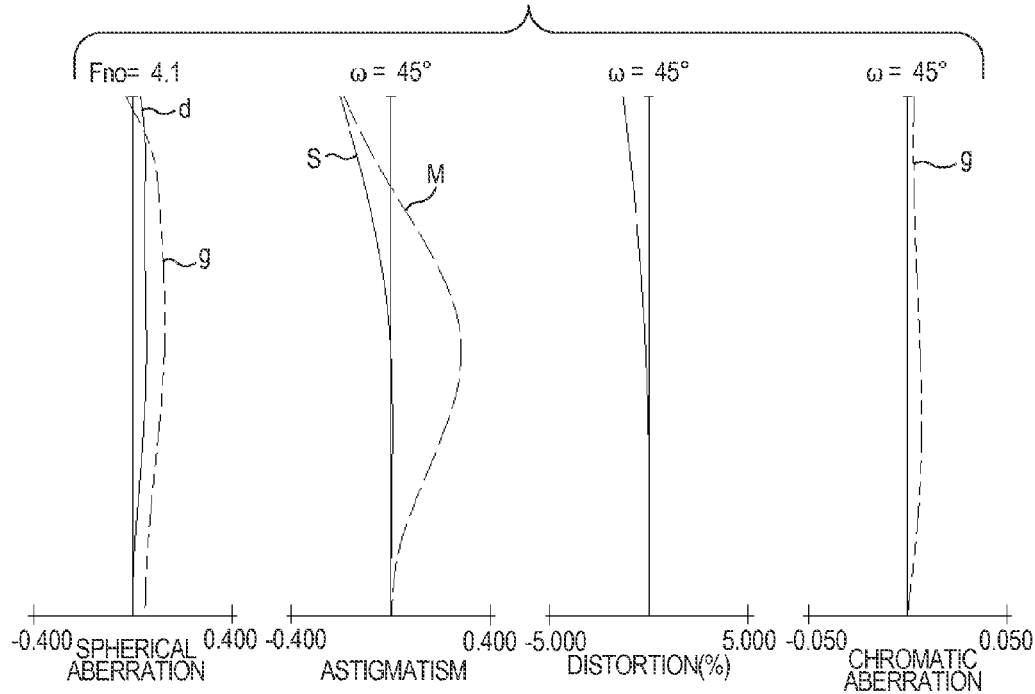
FIG. 9B is an aberration diagram of Embodiment 3 of the present invention at the telephoto end when focused on the close range.
Figure 10:
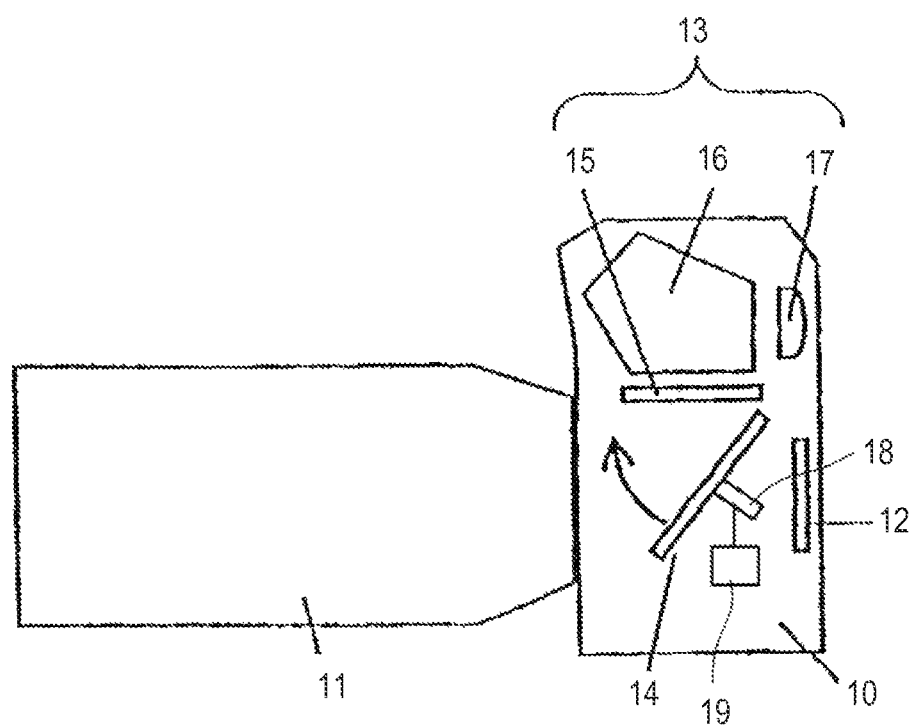
FIG. 10 is a schematic diagram of a main part of an image pickup apparatus of the present invention.

FIGS. 7A and 7B are lens sectional views of a zoom lens of Embodiment 3 at the wide angle end and the telephoto end, respectively, when focused on infinity. FIGS. 8A and 8B are aberration diagrams of the zoom lens of Embodiment 3 at the wide angle end and the telephoto end, respectively, when focused on infinity. FIGS. 9A and 9B are aberration diagrams of the zoom lens of Embodiment 3 at the wide angle end and the telephoto end, respectively, when focused on the close range. FIG. 10 is a schematic diagram of a main part of a single lens reflex camera (image pickup apparatus) that includes the zoom lens of the present invention.

The zoom lens of each embodiment is an image pickup optical system included in an image pickup apparatus, such as a video camera, a digital camera, or a silver halide film camera. In the lens sectional view, the left is the object side (front), and the right is the image side (rear). Furthermore, the zoom lens of each embodiment may be included in a projector. In this case, the left is the screen side, and the right is the side of a projected image. The lens sectional view represents the zoom lens OL.

The front unit LF has a negative refractive power. The rear unit LR includes at least one lens unit and has a positive refractive power over the entire zoom range. The order i of lens unit is counted from the object side, and represented as the i-th lens unit LRi. The first focus lens section F1, and the second focus lens section F2 are also illustrated. The lens section LP has a positive refractive power and is arranged on the image side with respect to the second focus lens section F2. A flare cut stop FP is for cutting flare light.

An aperture stop SP is variable in aperture diameter. A fully opened F-number aperture stop SP2 is also illustrated. The fully opened F-number aperture stop SP2 is of a diaphragm for maintaining the F-number constant or substantially constant over the entire zoom range by changing the aperture diameter through zooming. In the case of use as an image pickup optical system of a video camera or a digital still camera, an image plane IP corresponds to an image pickup plane of a solid-state image pickup element (photo-electric conversion element), such as a CCD sensor or a CMOS sensor. Alternatively, in the case of a camera for silver halide film, the image plane IP corresponds to a film surface. Arrows indicate movement loci of the lens units and flare cut stop FP during zooming from the wide angle end to the telephoto end.

The arrows related to focusing indicate the movement directions of the lens sections during focusing from infinity to the close range. Each longitudinal aberration diagram represents, from the left, the spherical aberration, astigmatism, distortion, and lateral chromatic aberration. In the diagram illustrating the spherical aberration and the lateral chromatic aberration, a symbol d denotes d-line (587.6 nm) and a symbol g denotes g-line (435.8 nm). In the diagram illustrating the astigmatism, a symbol S indicates the sagittal direction of d-line, and a symbol M indicates the meridional direction of d-line. The diagram illustrating the distortion represents the distortion for d-line. The F-number Fno and the half angle of view ω (degree) are also represented.

In Embodiment 1 of FIGS. 1A and 1B, the front unit LF consists of a first lens unit LR1 having a negative refractive power. The rear unit LR consists of a second lens unit LR2 having a positive refractive power, a third lens unit LR3 having a negative refractive power, and a fourth lens unit LR4 having a positive refractive power. The first focus lens section F1 having a positive refractive power is included in the second lens unit L2. The second focus lens section F2 having a negative refractive power is included in the third lens unit L3. The fourth lens unit LR4 corresponds to the lens section LP.

During zooming from the wide angle end to the telephoto end, as indicated by the arrow, the first lens unit LR1 moves to the image side. The second lens unit LR2 moves to the object side. The third lens unit LR3 moves to the object side integrally with the aperture stop SP and the fully opened F-number aperture stop SP2 (along the same locus). The fourth lens unit LR4 moves to the object side. During focusing from infinity to the close range, the first focus lens section F1 and the second focus lens section F2 move to the image side along respective loci that are different from each other. In Numerical Example 1 described later, the first focus lens section F1 corresponds to an optical system represented by lens surfaces r14 to r18, and the second focus lens section F2 corresponds to an optical system represented by lens surfaces r24 to r26.

The number of lens units, the refractive power of each lens unit, and the movement condition of each lens unit during zooming in Embodiment 2 of FIGS. 4A and 4B are the same as those in Embodiment 1. Furthermore, the first focus lens section F1, the second focus lens section F2, and the movement conditions of the first focus lens section F1 and the second focus lens section F2 during focusing are the same as those in Embodiment 1. In Numerical Example 2 described later, the first focus lens section F1 corresponds to an optical system represented by lens surfaces r14 to r18, and the second focus lens section F2 corresponds to an optical system represented by lens surfaces r24 to r27.

In Embodiment 3 of FIGS. 7A and 7B, the front unit LF consists of the first lens unit having a negative refractive power. The rear unit LR consists of the second lens unit LR2 having a positive refractive power. The second lens unit LR2 includes the first focus lens section F1 having a positive refractive power, the second focus lens section F2 having a negative refractive power, and the lens section LP having a positive refractive power.

During zooming from the wide angle end to the telephoto end, as indicated by the arrow, the first lens unit LR1 moves to the image side. The second lens unit LR2 moves to the object side integrally with the aperture stop SP and the fully opened F-number aperture stop SP2. During focusing from infinity to the close range, the first focus lens section F1 and the second focus lens section F2 move to the image side along the respective loci that are different from each other. In Numerical Example 3 described later, the first focus lens section F1 corresponds to an optical system represented by lens surfaces r13 to r15, and the second focus lens section F2 corresponds to an optical system represented by lens surfaces r24 to r26.

In each embodiment, the maximum amount of movement DF1 of the first focus lens section F1 is that during focusing from infinity to the close range, and the maximum amount of movement DF2 of the second focus lens section F2 is that during focusing from infinity to the close range. The focal length fLP is of the lens section LP. The focal length fF2 is of the second focus lens section F2. The focal length fLRw of the rear unit LR is at the wide angle end. The focal length fw of the entire system is at the wide angle end. Here, the following conditional expressions are satisfied.

$$0.0 < DF2/DF1 < 1.0, \quad (1)$$

$$0.5 < fLP/fLRw < 1.2, \text{ and} \quad (2)$$

$$-30.0 < fF2/fw < -6.0 \quad (3)$$

Next, the technical meaning of each of the conditional expressions is described. In proportion to improvement of wide angle of view, the effective diameter of the first lens unit becomes larger and the weight of the first lens unit becomes heavier in the negative-lead zoom lens. It is therefore desirable to perform focusing through a relatively smaller lens section that is the second lens unit or thereafter.

In the zoom lens of each embodiment, the rear unit LR consisting of the second lens unit and thereafter has a positive refractive power over the entire zoom range, and the lens unit or the lens section that has the negative refractive power in the rear unit LR has a role of correcting the aberrations that are to be caused by the lens unit or the lens section having the positive refractive power. Accordingly, if the lens section having the negative refractive power in the rear unit LR is largely moved during focusing, variation in aberration increases during focusing.

The conditional expression (1) appropriately configures the ratio of the amounts of movement of the first focus lens section F1 and the second focus lens section F2 during focusing. If the amount of movement of the second focus lens section F2 increases more than that of the first focus lens section F1 so as to exceed the upper limit value of the conditional expression (1), variation in aberration increases during focusing. It is further desirable to configure the numerical value range of the conditional expression (1) as follows.

$$0.01 < DF2/DF1 < 0.50 \quad (1a)$$

The conditional expression (2) appropriately configures the ratio of the refractive power of the lens section LP having the positive refractive power to the refractive power fLRw of the rear unit LR at the wide angle end. The off-axis rays incident on the lens section LP having the positive refractive power have a large incident height from the optical axis, and largely affect variation in image plane.

If the refractive power of the lens section LP having the positive refractive power increases so as to exceed the lower limit value of the conditional expression (2), the aberration caused by the lens section LP increases and variation in the angle of off-axis rays passing through the lens section LP increases, which in turn increases the amount of occurrence of off-axial aberration. Here, if the second focus lens section F2 is moved on the optical axis, the angle of rays incident on the lens section LP largely varies. Consequently, variation in the off-axial aberration increases during focusing.

If the refractive power of the lens section LP having the positive refractive power decreases so as to exceed the upper limit value of the conditional expression (2), the effect of correcting the aberration by the second focus lens section F2 decreases. Furthermore, the amount of movement of the second focus lens section F2 during focusing is required to be increased, thereby increasing the lens total length. It is further desirable to configure the numerical value range of the conditional expression (2) as follows.

$$0.7<fLP/fLR<1.0 \quad (2a)$$

The conditional expression (3) configures the ratio of the focal length of the second focus lens section F2 to the focal length of the entire system at the wide angle end. If the negative refractive power of the second focus lens section F2 becomes stronger (the absolute value of the negative refractive power increases) so as to exceed the upper limit value of the conditional expression (3), corrections of the variation in aberration during focusing due to floating and the variation in aberration during zooming in an appropriately balanced manner become difficult.

If the negative refractive power of the second focus lens section F2 becomes weaker (the absolute value of the negative refractive power decreases) so as to exceed the lower limit value of the conditional expression (3), the effect of correcting the aberration of the second focus lens section F2 decreases.

It is further desirable to configure the numerical value range of the conditional expression (3) as follows.

$$-28.0<fF2/fw<-7.0 \quad (3a)$$

According to each embodiment, the lens configuration is specified as described above. Consequently, the variation in aberration during focusing, particularly the variation in field curvature at the wide angle end, is reduced, which can achieve a zoom lens having favorable optical characteristics.

In each embodiment, to further correct the variation in aberration during focusing and achieve favorable optical characteristics, it is desirable that at least one of the following conditional expressions be satisfied. The front unit LF has a focal length fLF. The first focus lens section F1 has a focal length fF1. The distance DLP on the optical axis from the lens surface of the second focus lens section on the most image side to the lens surface of the lens section LP on the most object side is that at the wide angle end. The entire optical length TDw (the distance from the first lens surface to the final lens surface) is that at the wide angle end. Here, it is appropriate to satisfy at least one of the following conditional expressions.

$$-2.5<fLF/fw<-1.1 \quad (4)$$

$$-6.0<fF2/fF1<-1.0 \quad (5)$$

$$0.001<DLP/TDw<0.100 \quad (6)$$

Next, the technical meaning of each of the conditional expressions is described.

The conditional expression (4) appropriately configures the focal length of the front unit LF having a negative refractive power with respect to the focal length of the entire system at the wide angle end. If the negative refractive power of the front unit LF increases (the absolute value of the refractive power increases) so as to exceed the upper limit of the conditional expression (4), reduction in the size of the entire system is facilitated but the distortion increases. Consequently, correction of the aberration becomes difficult. If the negative refractive power of the front unit LF decreases (the absolute value of the negative refractive power decreases) so as to exceed the lower limit of the conditional expression (4), correction of the distortion is facilitated but reduction in the size of the entire system becomes difficult. It is further desirable to configure the numerical value range of the conditional expression (4) as follows.

$$-2.2<fLF/fw<-1.4 \quad (4a)$$

The conditional expression (5) appropriately configures the refractive powers of the first focus lens section F1 and the second focus lens section F2. If the positive refractive power of the first focus lens section F1 increases so as to exceed the lower limit of the conditional expression (5), correction of various aberrations typified by the spherical aberration caused by the first focus lens section F1 becomes difficult.

If the positive refractive power of the first focus lens section F1 decreases so as to exceed the upper limit of the conditional expression (5), the amount of movement of the first focus lens unit F1 increases during focusing and the lens total length increases, which are unfavorable. It is further desirable to configure the numerical value range of the conditional expression (5) as follows.

$$-5.5<fF2/fF1<-1.5 \quad (5a)$$

The conditional expression (6) appropriately configures the distance on the optical axis from the final lens surface of the second focus lens section F2 to the first lens surface on the object side of the lens section LP having the positive refractive power. If the distance on the optical axis from the final lens surface of the second focus lens unit F2 to the first lens surface of the lens unit LP having the positive refractive power increases so as to exceed the upper limit of the conditional expression (6), the lens total length increases.

If the distance on the optical axis from the final surface of the second focus lens unit F2 to the first lens surface of the lens unit LP having the positive refractive power decreases so as to exceed the lower limit of the conditional expression (6), the amount of movement during floating is difficult to sufficiently secure, thereby reducing the effect of correcting the aberrations.

It is further desirable to configure the numerical value range of the conditional expression (6) as follows.

$$0.005<DLP/TDw<0.07 \quad (6a)$$

If the aberrations remain excessively in the focus lens section, the variation in aberration increases during focusing. To reduce occurrence of various aberrations typified by the chromatic aberration caused by the focus lens section, it is desirable that in each embodiment, the first focus lens section F1 and the second focus lens section F2 include a cemented lens of a positive lens and a negative lens.

In a negative-lead zoom lens, a leading lens unit having a negative refractive power is required to have a stronger negative refractive power to achieve a lens system having a wider angle of view. In general, the stronger the power of a leading lens unit having a negative refractive power becomes, the more the negative distortion occurs. Here, to reduce occurrence of the negative distortion, it is appropriate that a meniscus-shaped negative lens having a convex surface on the object side be arranged on the most object side (enlargement conjugate side) of the leading lens unit having a negative refractive power. This arrangement allows the peripheral light flux (the light flux in peripheral angle of view) to be incident at an angle close to the normal. Consequently, reduction in occurrence of the distortion can be facilitated.

In each embodiment, to reduce occurrence of the distortion, it is desirable that the front unit LF having the negative refractive power include a positive lens and at least four meniscus-shaped negative lenses. According to achievement of a wider angle of view, correction of the meridional image plane and correction of distortion become steeply insufficient. Thus, in each embodiment, to sufficiently achieve such corrections, it is desirable that the front unit LF having the negative refractive power have two aspherical surfaces.

Next, an embodiment of a single lens reflex camera system (image pickup apparatus) that includes a zoom lens of the present invention is described with reference to FIG. 10. FIG. 10 illustrates a single lens reflex camera main body 10, and an interchangeable lens 11 where the zoom lens of the present invention is mounted. The diagram also illustrates a recording unit 12, such as film or an image pickup element, for receiving light of an object image obtained through the interchangeable lens 11. The diagram further illustrates a viewfinder optical system 13 for allowing the object image from the interchangeable lens 11 to be observed, and a quick return mirror 14 that turns to relay the object image formed by the interchangeable lens 11 to one of the recording unit 12 and the viewfinder optical system 13 in a switched manner.

When the object image is observed through the viewfinder, the object image imaged on a focusing screen 15 via the quick return mirror 14 is converted into an erect image by a pentaprism 16 and subsequently enlarged by an eyepiece optical system 17 and observed. When an image is taken, the quick return mirror 14 turns in the arrow direction to allow the object image to be imaged on the recording unit 12 and recorded. The diagram further illustrates a sub-mirror 18, and a focus detector 19.

The zoom lens of the present invention is thus applied to the image pickup apparatus, such as the interchangeable lens, in the single lens reflex camera. Such application can achieve the image pickup apparatus having fine optical characteristics. The present invention is also applicable to a mirrorless camera that includes no quick return mirror, in an analogous manner.

Specific numerical value data on zoom lenses of Numerical Examples 1 to 3 corresponding to respective Embodiments 1 to 3 is hereinafter described. The order i is counted from the object. The surface number i is sequentially counted from the object side. The curvature radius ri is of the i-th surface. The interval di is between i-th and (i+1)-th surfaces. The refractive index ndi and the Abbe number vdi are of a medium between the i-th surface and the (i+1)-th surface for d-line. The back focus BF is the distance from the final lens surface to the image plane. The lens total length is obtained by adding the air-equivalent back focus value to the length from the first lens surface to the final lens surface.

An aspherical surface is represented by adding a symbol * after the surface number. The shape of the aspherical surface is represented as follows:

$$x=(h^2/R)/[1+\{1-(1+k)(h/R)^2\}^{1/2}+A4 \cdot h^4+A6 \cdot h^6+A8 \cdot h^8+A10 \cdot h^{10}+A12 \cdot h^{12}+A14 \cdot h^{14},$$

where X is the amount of displacement in the optical axis direction from the apex of lens surface, h is the height from the optical axis in the direction perpendicular to the optical axis, R is the paraxial curvature radius, k is the conic constant, and A4, A6, A8, A10, A12 and A14 are aspherical coefficients of the respective degrees. "e±XX" in each aspherical coefficient means "×10$^{\pm XX}$". Table 1 lists numerical values related to each of the conditional expressions.

Numerical Example 1

| | Unit mm | | | |
|---|---|---|---|---|
| | Surface Data | | | |
| Surface Number | r | d | nd | vd |
| 1 | 38.185 | 3.10 | 2.00100 | 29.1 |
| 2 | 25.262 | 9.54 | | |
| 3* | 36.270 | 2.50 | 1.88300 | 40.8 |
| 4 | 22.105 | 6.42 | | |
| 5 | 29.521 | 2.30 | 1.55332 | 71.7 |
| 6* | 17.529 | 7.46 | | |
| 7 | 72.683 | 1.62 | 1.91082 | 35.3 |
| 8 | 33.654 | 7.42 | | |
| 9 | −52.842 | 1.60 | 1.49700 | 81.5 |
| 10 | 68.106 | 2.02 | | |
| 11 | 46.700 | 5.80 | 1.72047 | 34.7 |
| 12 | −94.149 | (Variable) | | |
| 13 | ∞ | (Variable) | | (Flare Cut Stop) |
| 14 | 27.216 | 1.20 | 1.88202 | 37.2 |
| 15 | 14.509 | 3.53 | 1.62004 | 36.3 |
| 16 | −509.663 | 1.00 | | |
| 17 | −29.731 | 3.38 | 1.92286 | 18.9 |
| 18 | −31.669 | 3.74 | | |
| 19 | 68.147 | 1.93 | 1.43875 | 94.9 |
| 20 | −83.666 | (Variable) | | |
| 21 | ∞ | 5.30 | | (Aperture Stop) |
| 22 | −58.487 | 1.25 | 2.00272 | 19.3 |
| 23 | 2078.095 | 0.54 | | |
| 24 | −71.463 | 1.00 | 1.77250 | 49.6 |
| 25 | 30.889 | 2.24 | 1.80809 | 22.8 |
| 26 | −122.485 | 1.00 | | |
| 27 | ∞ | (Variable) | | (Fully Opened F-Number Aperture Stop) |
| 28 | 18.590 | 4.59 | 1.49700 | 81.5 |
| 29 | −31.917 | 0.10 | | |
| 30 | −800.695 | 1.00 | 2.00330 | 28.3 |
| 31 | 24.033 | 0.00 | | |
| 32 | 24.033 | 5.37 | 1.43875 | 94.9 |
| 33 | −48.503 | 0.00 | | |
| 34 | −48.503 | 1.40 | 1.85135 | 40.1 |
| 35* | −54.144 | (Variable) | | |
| 36 | Image Plane | | | |

| Aspherical Surface Data |
|---|
| Third Surface |

| K = 0.00000e+000 | A4 = 8.61533e−006 | A6 = −8.52847e−009 |
|---|---|---|
| A8 = 1.71522e−011 | A10 = −1.87989e−014 | A12 = 1.42820e−017 |

Sixth Surface

| K = −9.41745e−001 | A4 = 2.13551e−005 | A6 = −5.61566e−008 |
|---|---|---|
| A8 = 4.23721e−011 | A10 = −2.55585e−013 | A12 = 1.76981e−016 |

Thirty-Fifth Surface

| K = −1.65308e+001 | A4 = 1.81854e−005 | A6 = 1.25373e−007 |
|---|---|---|
| A8 = 5.64157e−010 | A10 = −1.78189e−012 | A12 = 1.99683e−014 |

| Various Data | | | | | |
|---|---|---|---|---|---|
| Zoom Ratio 1.90 | | | | | |
| Focal Length | 12.40 | 17.15 | 23.60 | 14.89 | 19.88 |
| F-number | 4.10 | 4.10 | 4.10 | 4.10 | 4.10 |
| Half Angle of View (degree) | 60.18 | 51.59 | 42.51 | 55.46 | 47.42 |
| Image Height | 21.64 | 21.64 | 21.64 | 21.64 | 21.64 |
| Lens Total Length | 163.45 | 152.41 | 149.98 | 155.75 | 150.19 |
| BF | 38.80 | 45.68 | 55.61 | 42.6 | 49.84 |
| d12 | 26.70 | 11.08 | 0.50 | 16.71 | 5.68 |
| d13 | 4.02 | 2.15 | 0.50 | 3.33 | 1.42 |
| d20 | 1.00 | 2.87 | 4.52 | 1.69 | 3.60 |
| d27 | 4.59 | 2.29 | 0.50 | 3.08 | 1.31 |
| d35 | 38.80 | 45.68 | 55.61 | 42.6 | 49.84 |

Numerical Example 2

| Unit mm | | | | |
|---|---|---|---|---|
| Surface Data | | | | |
| Surface Number | r | d | nd | vd |
| 1 | 39.531 | 3.10 | 2.00100 | 29.1 |
| 2 | 26.215 | 9.73 | | |
| 3* | 36.904 | 2.50 | 1.88300 | 40.8 |
| 4 | 22.374 | 8.25 | | |
| 5 | 29.106 | 2.30 | 1.55332 | 71.7 |
| 6* | 19.423 | 6.71 | | |
| 7 | 71.914 | 1.62 | 1.91082 | 35.3 |
| 8 | 33.432 | 7.99 | | |
| 9 | −56.532 | 1.60 | 1.49700 | 81.5 |
| 10 | 48.416 | 2.89 | | |
| 11 | 43.062 | 5.43 | 1.72047 | 34.7 |
| 12 | −164.562 | (Variable) | | |
| 13 | ∞ | (Variable) | | (Flare Cut Stop) |
| 14* | 28.452 | 1.20 | 1.88202 | 37.2 |
| 15 | 17.272 | 3.08 | 1.62004 | 36.3 |
| 16 | 412.769 | 1.10 | | |
| 17 | −32.489 | 2.00 | 1.92286 | 18.9 |
| 18 | −31.649 | 3.34 | | |
| 19 | 56.306 | 1.94 | 1.43875 | 94.9 |
| 20 | −110.152 | (Variable) | | |
| 21 | ∞ | 2.37 | | (Aperture Stop) |
| 22 | −71.556 | 1.25 | 2.00100 | 29.1 |
| 23 | 239.288 | 0.53 | | |
| 24 | −75.928 | 1.00 | 1.77250 | 49.6 |
| 25 | 79.219 | 1.55 | 1.92286 | 18.9 |
| 26 | −199.961 | 1.51 | 1.72151 | 29.2 |
| 27 | −188.016 | 1.00 | | |
| 28 | ∞ | (Variable) | | (Fully Opened F-Number Aperture Stop) |
| 29 | 18.213 | 4.95 | 1.49700 | 81.5 |
| 30 | −30.733 | 0.10 | | |
| 31 | 416.278 | 1.00 | 2.00330 | 28.3 |
| 32 | 22.659 | 0.00 | | |
| 33 | 22.659 | 4.48 | 1.43875 | 94.9 |
| 34 | −33.949 | 0.00 | | |
| 35 | −33.949 | 1.40 | 1.85135 | 40.1 |
| 36* | −50.079 | (Variable) | | |
| 37 | Image Plane | | | |

Aspherical Surface Data

Third Surface

K = 0.00000e+000  A4 = 7.43934e−006  A6 = −3.80475e−009
A8 = 1.62870e−011  A10 = −2.54166e−014  A12 = 2.55155e−017

Sixth Surface

K = −1.06541e+000  A4 = 1.71640e−005  A6 = −4.20554e−008
A8 = 3.51755e−011  A10 = −2.27683e−013  A12 = 1.99376e−016

Fourteenth Surface

K = −6.56414e−001  A4 = −1.81728e−007  A6 = −7.37920e−008
A8 = 2.05476e−009  A10 = −2.78714e−011  A12 = 1.33883e−013

Thirty-Sixth Surface

K = −1.57779e+001  A4 = 1.87397e−005  A6 = 1.56074e−007
A8 = 8.22872e−010  A10 = −4.88798e−012  A12 = 4.50788e−014

Various Data
Zoom Ratio 2.07

| | | | | | |
|---|---|---|---|---|---|
| Focal Length | 11.40 | 17.21 | 23.60 | 14.40 | 20.47 |
| F-number | 4.10 | 4.10 | 4.10 | 4.10 | 4.10 |
| Half Angle of View (degree) | 62.21 | 51.51 | 42.51 | 56.36 | 46.59 |
| Image Height | 21.64 | 21.64 | 21.64 | 21.64 | 21.64 |
| Lens Total Length | 162.84 | 150.87 | 150.47 | 154.16 | 149.28 |
| BF | 38.80 | 47.16 | 57.21 | 43.3 | 52.13 |
| d12 | 24.72 | 8.49 | 0.50 | 13.91 | 3.93 |
| d13 | 5.35 | 2.42 | 0.50 | 4.08 | 1.40 |
| d20 | 1.00 | 3.93 | 5.85 | 2.27 | 4.94 |
| d28 | 7.05 | 2.95 | 0.50 | 4.69 | 0.96 |
| d36 | 38.80 | 47.16 | 57.21 | 43.3 | 52.13 |

Numerical Example 3

| Unit mm | | | | |
|---|---|---|---|---|
| Surface Data | | | | |
| Surface Number | r | d | nd | vd |
| 1 | 52.263 | 3.50 | 1.88300 | 40.8 |
| 2 | 33.901 | 9.00 | | |
| 3 | 44.686 | 3.50 | 1.49710 | 81.6 |
| 4* | 16.778 | 8.50 | | |
| 5 | 34.094 | 2.80 | 1.74100 | 52.6 |
| 6* | 21.772 | 7.31 | | |
| 7 | 58.936 | 2.00 | 1.49700 | 81.5 |
| 8 | 24.964 | 8.61 | | |
| 9 | −63.417 | 1.80 | 1.49700 | 81.5 |
| 10 | 37.699 | 3.31 | | |
| 11 | 39.346 | 6.36 | 1.61340 | 44.3 |
| 12 | −83.133 | (Variable) | | |
| 13 | 26.485 | 1.00 | 1.85026 | 32.3 |
| 14 | 15.747 | 3.20 | 1.61293 | 37.0 |
| 15 | 7097.120 | 5.5 | | |
| 16 | ∞ | 1.00 | | (Fully Opened F-Number Aperture Stop) |
| 17 | ∞ | 1.62 | | (Aperture Stop) |
| 18 | 133.780 | 2.28 | 1.51633 | 64.1 |
| 19 | −29.972 | 1.85 | | |
| 20 | −25.907 | 2.50 | 1.83481 | 42.7 |
| 21 | 45.537 | 1.34 | | |
| 22 | 19.321 | 2.63 | 1.62588 | 35.7 |
| 23 | 166.683 | 0.77 | | |
| 24 | 30.506 | 1.00 | 1.83481 | 42.7 |
| 25 | 12.260 | 3.43 | 1.49700 | 81.5 |
| 26 | 43.740 | 1.10 | | |
| 27 | 19.807 | 5.03 | 1.49700 | 81.5 |
| 28 | −33.450 | 0.10 | | |
| 29 | −58.693 | 1.09 | 1.81600 | 46.6 |
| 30 | 14.771 | 5.95 | 1.58313 | 59.4 |
| 31* | −40.357 | (Variable) | | |
| Image Plane | ∞ | | | |

Aspherical Surface Data

Fourth Surface

K = −6.34880e−001  A4 = −5.92565e−006  A6 = −2.22698e−009
A8 = −3.52898e−011  A10 = 9.36132e−014  A12 = −1.13043e−016

Sixth Surface

K = −3.64970e+000  A4 = 4.35269e−005  A6 = −7.11321e−008
A8 = 2.10170e−010  A10 = −4.31046e−013  A12 = 5.27438e−016
A14 = −7.40370e−020

Thirty-First Surface

K = −9.16280e+000  A4 = 1.13483e−005  A6 = −8.65072e−009
A8 = 1.70277e−009  A10 = −1.34283e−011  A12 = 3.88670e−014

Various Data
Zoom Ratio 1.74

| | Wide Angle | Intermediate | Telephoto |
|---|---|---|---|
| Focal Length | 12.40 | 17.00 | 21.60 |
| F-number | 4.10 | 4.10 | 4.10 |
| Half Angle of View (degree) | 60.18 | 51.84 | 45.05 |

-continued

Unit mm

| | | | |
|---|---|---|---|
| Image Height | 21.64 | 21.64 | 21.64 |
| Lens Total Length | 168.15 | 158.08 | 155.93 |
| BF | 38.82 | 47.32 | 55.83 |
| d12 | 31.25 | 12.68 | 2.02 |
| d31 | 38.82 | 47.32 | 55.83 |

TABLE 1

| Conditional Expression | Embodiment 1 | Embodiment 2 | Embodiment 3 |
|---|---|---|---|
| (1) | 0.236 | 0.284 | 0.026 |
| (2) | 1.039 | 1.029 | 1.042 |
| (3) | −27.489 | −26.294 | −7.356 |
| (4) | −1.759 | −1.747 | −1.730 |
| (5) | −5.412 | −4.408 | −1.570 |
| (6) | 0.045 | 0.065 | 0.008 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-204657, filed Oct. 3, 2014, which is hereby incorporated by reference herein in its entirety.

What is claimed is:

1. A zoom lens comprising, in order from an object side to an image side: a front unit that consists of a first lens unit having a negative refractive power; and a rear unit that includes at least one lens unit and has a positive refractive power over an entire zoom range, an interval between the front unit and the rear unit varying during zooming,
wherein the rear unit includes: a first focus lens section that has a positive refractive power and moves to the image side during focusing from infinity to a close range; a second focus lens section that has a negative refractive power and moves to the image side along a locus different from a locus of the first focus lens section during focusing from infinity to the close range; and a lens section LP that has a positive refractive power and is immovable during focusing, the lens section LP being arranged on the image side with respect to the second focus lens section, and
the zoom lens satisfies following conditional expressions, $0.0<DF2/DF1<1.0$, $0.5<fLP/fLRw<1.2$, and $-30.0<fF2/fw<-6.0$, where DF1 is a maximum amount of movement of the first focus lens section during focusing from infinity to the close range, DF2 is a maximum amount of movement of the second focus lens section during focusing from infinity to the close range, fLP is a focal length of the lens section LP, fF2 is a focal length of the second focus lens section, fLRw is a focal length of the rear unit at a wide angle end, and fw is a focal length of the zoom lens at the wide angle end.

2. The zoom lens according to claim 1, wherein the zoom lens satisfies a following conditional expression, $-2.5<fLF/fw<-1.1$, where fLF is a focal length of the front unit.

3. The zoom lens according to claim 1, wherein the zoom lens satisfies a following conditional expression, $-6.0<fF2/fF1<-1.0$, where fF1 is a focal length of the first focus lens section.

4. The zoom lens according to claim 1, wherein the zoom lens satisfies a following conditional expression, $0.001<DLP/TDw<0.100$, where DLP is a distance on an optical axis from a lens surface of the second focus lens section on the most image side to a lens surface of the lens section LP on the most object side at the wide angle end, and TDw is an entire optical length at the wide angle end.

5. The zoom lens according to claim 1, wherein each of the first focus lens section and the second focus lens section includes a cemented lens where a positive lens and a negative lens are cemented to each other.

6. The zoom lens according to claim 1, wherein the front unit includes a positive lens, and at least four meniscus-shaped negative lenses.

7. The zoom lens according to claim 1, wherein the rear unit consists of, in order from the object side to the image side, a second lens unit having a positive refractive power, a third lens unit having a negative refractive power, and a fourth lens unit having a positive refractive power, wherein the first focus lens section is included in the second lens unit, wherein the second focus lens section is included in the third lens unit, and wherein the lens section LP is the fourth lens unit.

8. The zoom lens according to claim 1, wherein the rear unit consists of a second lens unit having a positive refractive power.

9. An image pickup apparatus, comprising:
a zoom lens; and
a solid-state image pickup element that receives light of an image formed by the zoom lens,
wherein the zoom lens comprises, in order from an object side to an image side: a front unit that consists of a first lens unit having a negative refractive power; and a rear unit that includes at least one lens unit and has a positive refractive power over an entire zoom range, an interval between the front unit and the rear unit varying during zooming,
the rear unit includes: a first focus lens section that has a positive refractive power and moves to the image side during focusing from infinity to a close range; a second focus lens section that has a negative refractive power and moves to the image side along a locus different from a locus of the first focus lens section during focusing from infinity to the close range; and a lens section LP that has a positive refractive power and is immovable during focusing, the lens section LP being arranged on the image side with respect to the second focus lens section, and
the zoom lens satisfies following conditional expressions, $0.0<DF2/DF1<1.0$, $0.5<fLP/fLRw<1.2$, and $-30.0<fF2/fw<-6.0$, where DF1 is a maximum amount of movement of the first focus lens section during focusing from infinity to the close range, DF2 is a maximum amount of movement of the second focus lens section during focusing from infinity to the close range, fLP is a focal length of the lens section LP, fF2 is a focal length of the second focus lens section, fLRw is a focal length of the rear unit at a wide angle end, and fw is a focal length of the zoom lens at the wide angle end.

* * * * *